United States Patent [19]
Allaigre

[11] 3,761,747
[45] Sept. 25, 1973

[54] LINEAR INDUCTION MOTOR MAGNETIC FIELD ASSEMBLAGE PRODUCING CONSTANT THRUST PER UNIT WIDTH OF THE ARMATURE

[75] Inventor: André Allaigre, Poisat, France

[73] Assignee: Merlin Gerin, Societe Anonyme, Grenoble, France

[22] Filed: May 17, 1972

[21] Appl. No.: 254,178

[30] Foreign Application Priority Data
May 28, 1971 France .......................... 7119683

[52] U.S. Cl. ................................................ 310/13
[51] Int. Cl. ........................................... H02k 41/04
[58] Field of Search .......... 310/12-14; 109/148 LM; 318/135, 121

[56] References Cited
UNITED STATES PATENTS

| | | | |
|---|---|---|---|
| 3,122,818 | 11/1971 | Payen | 310/13 |
| 3,628,072 | 12/1971 | Nicholson | 310/13 |
| 3,644,762 | 2/1972 | Eastham | 310/13 |
| 3,497,730 | 2/1970 | Doolittle | 310/13 |
| 3,679,952 | 7/1972 | Pelenc | 310/13 X |
| 3,610,972 | 10/1971 | Pelenc | 310/13 |

*Primary Examiner*—D. F. Duggan
*Attorney*—Richard K. Stevens et al.

[57] ABSTRACT

A linear induction motor, polyphase energizable magnetic field assemblage defining a plurality of spaced apart longitudinally extending pole faces energized by a common winding. Each pole face is linked with its proper induced loop current in the armature so that the motor produces a substantially constant reaction force per unit width of the armature permitting homogeneous propelling, braking or tensioning of distinct juxtaposed armature strips.

4 Claims, 3 Drawing Figures

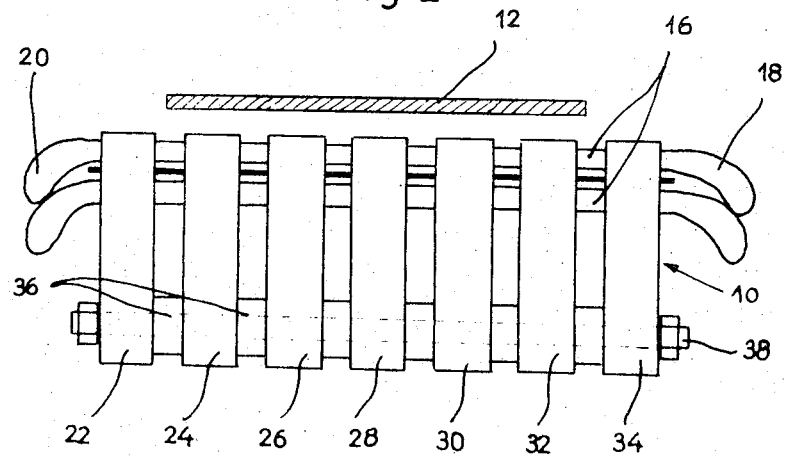
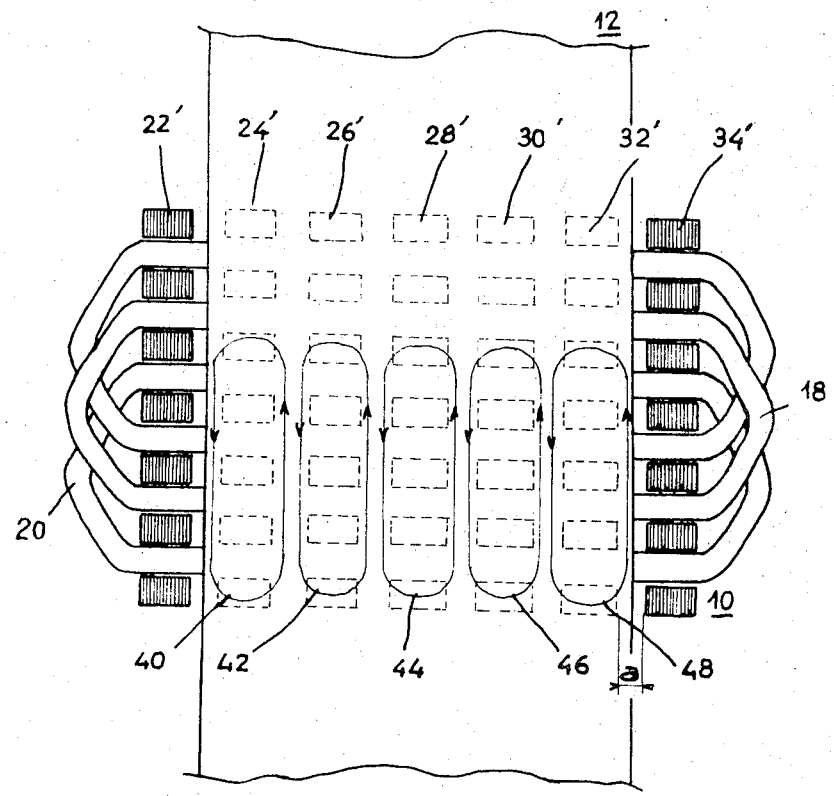

LINEAR INDUCTION MOTOR MAGNETIC FIELD ASSEMBLAGE PRODUCING CONSTANT THRUST PER UNIT WIDTH OF THE ARMATURE

This invention relates to a linear induction motor magnetic field assemblage producing, when polyphase energized, a magnetic field traveling along an end surface thereof to produce a reaction force in an armature adapted for relative movement with respect to the magnetic field assemblage.

Linear induction motors of this type are known, which are used for propelling metal strips or for braking moving metal strips. The magnetic circuit of the field assemblage is generally formed of stacked laminations which are slotted at an end surface, known as pole face or air gap face thereof to accommodate a polyphase winding. The laminations constitute a compact bloc in order to provide a maximum pole face and therefore a maximum thrust exerted on the armature facing this pole face. The total thrust is, of course, variable as a function of the actual width of an armature strip cooperating with the magnetic field assemblage, but the unit thrust exerted on different juxtaposed units of width of the armature strips is also variable, due to the non homogeneous distribution of the induced current density in the armature, resulting from marginal effects.

As a consequence, the stators of the prior art linear induction motors are ineffective in certain applications, mainly when a single stator is used to propel, brake or tension simultaneously a plurality of juxtaposed armature strips.

It is an object of the invention to provide a magnetic field assemblage producing a more homogeneously distributed reaction force in an armature, i.e., a more constant reaction force per unit width of the armature, permitting for example to tension regularly a plurality of juxtaposed armature strips to be wound on rotating spools or mandrels after having been cut from a single strip in a slitter.

This and other objects and advantages of the invention, together with the organization and operation thereof will be understood from the following description of a preferred embodiment shown in the accompanying drawings, in which :

FIG. 2 is a side view of a motor of the type shown in FIG. 1;

FIG. 3 is a top view of the motor of FIG. 2.

Figure 1:
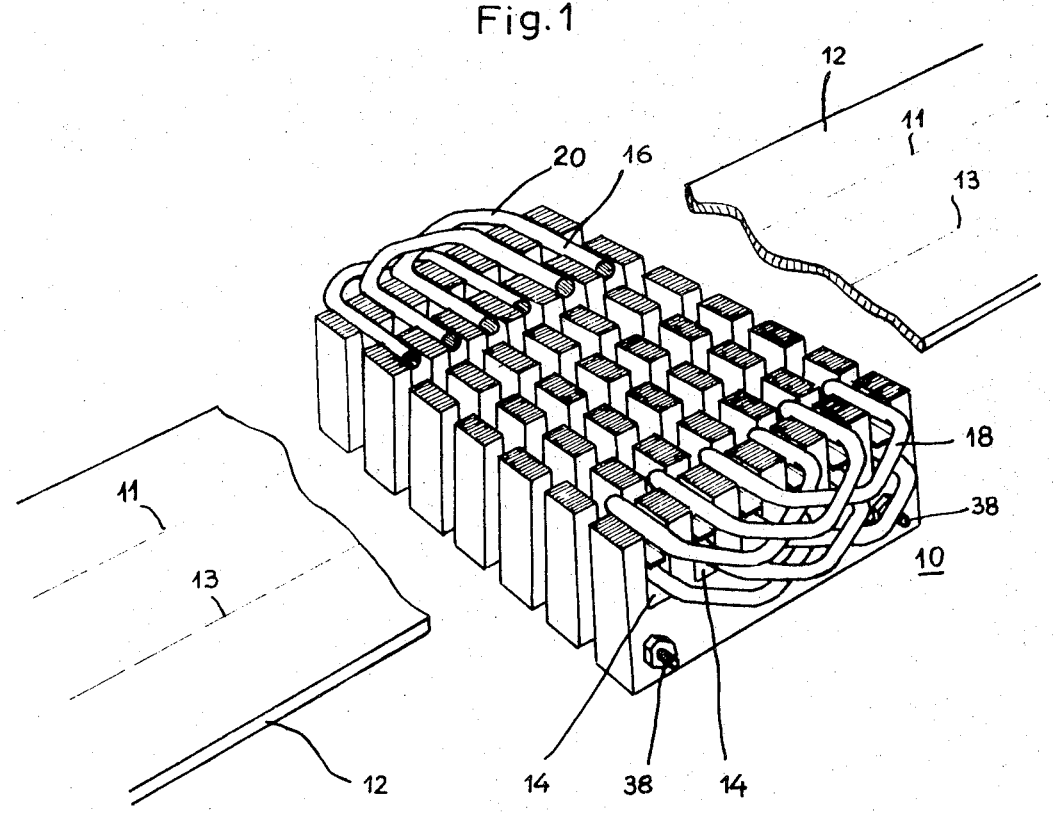
FIG. 1 is a perspective view of a linear induction motor in accordance with the invention, the armature as well as the active part of the windings being shown broken away.

In the figures, a magnetic field assemblage 10, which may be stationary, cooperates with a metal strip 12 capable of moving along its longitudinal direction. A single strip 12 has been shown in the drawings for a better understanding of the invention, but it is to be understood that the full benefit of the invention is mainly derived in the case of an armature longitudinally slit up into a plurality of juxtaposed distinct strips as indicated by the dashed lines 11 and 13 in FIG. 1. The stator 10 is formed of a magnetic circuit whose end surface, facing the strip which forms the armature element 12 of the motor, is provided with transverse slots 14 which accommodate the active conductors of the polyphase winding 16 capable of producing a magnetic field traveling along the end face of the stator in the longitudinal direction of the armature strip 12. The coil heads of the winding 16 are shown at 18 and 20 in the figures.

Referring now more particularly to FIGS. 2 and 3, it is seen that the magnetic circuit of the magnetic field structure 10 is formed of a stack of thin plates of magnetic material, commonly called laminations, which extend in longitudinal vertical planes and that it is broken up or divided into a plurality of juxtaposed individual elements 22, 24, 26, 28, 30, 32 and 34 which are uniformly spaced apart. The active pole surface of the magnetic circuit of the stator 10 is thus composed of a plurality of parallel elementary pole faces 22', 24', 26', 28', 30', 32' and 34' formed by the upper end surface of the unit magnetic circuits 22 to 34. The pole faces 22' to 34' extend along the longitudinal direction of the armature strip 12 and are spaced from each other by air gaps of a width a. The spacing a is defined by spacer members 36 interposed between the elementary magnetic circuits, tie rods 38 holding the stacked laminations of the magnetic circuit firmly together.

This linear induction motor operates in the following manner :

The pole faces 24' to 32' of the stator 10 each produce induced currents in coextensive portions of the facing armature surface 12, said currents being diagrammatically shown in thin lines 40, 42, 44, 46 and 48 in FIG. 3. The spacing a between the pole surfaces is sufficient to permit the closing of the induced currents by the inactive armature portions facing the spaces a. This results in a plurality of small loops as 40, 42, 44, 46 and 48 of induced currents, each being associated with and located opposite a corresponding pole face 24', 26', 28', 30' and 32'. As no substantial interaction takes place between the unit loops 40, 42, 44, 46, 48, because of the sufficient spacing at distances a of the pole faces, it is easy to see that the resultant thrust is the sum of the unit thrusts resulting from the five active pole faces 24', 26', 28', 30', 32'. In the case of a strip 12 of different width covering a different number of pole faces, the total active thrust produced by the reaction forces generated by the induced currents would be different and approximately proportional to the total width of the armature strip. Per unit or width of strip 12, the thrust is therefore substantially constant. It is to be noted that the maximum thrust (or reaction force) is, of course, less than that obtained by a compact, not divided stator because of the presence of the intervals a but this drawback is largely compensated for by the more regular distribution of the partial thrusts (or reaction forces) along the width of the armature.

The polyphase winding accomodated in registering slots of the different pole faces 22' to 34' is common to the different parts of the divided stator 10 which permits to dispense with coil or winding heads such as 18 and 20 in the intervals of width a between the units 22 to 34. Of course, in each case the width a must be chosen sufficiently great to rule out interference between juxtaposed loop currents which would mean a return to the undesired marginal effects inherent to the compact undivided stator of the prior art. As a rule of thumb, the width a of the passages provided between the units of the magnetic circuit can be made substantially equal to the width of these units 22 to 34. The channels provided within the magnetic circuit by the spaces of width a facilitate forced or natural circulation of a cooling fluid, for instance air, which is particularly advantageous in the case of a linear motor which, as is well known, has a tendency to heat up. It will be understood that the units 22 to 34 need not be constituted of distinct stacks of laminations, as shown, but can have a common yoke at the side opposed to the salient pole faces 22' to 34'.

What is claimed is :

1. A linear induction motor, polyphase energizable magnetic field assemblage adapted to generate, when energized, a magnetic field traveling along an end surface thereof to produce a reaction force in armature strip means adapted for relative movement with respect to and over said end surface, said magnetic field assemblage comprising a plurality of elementary magnetic circuits cooperating with a common polyphase field winding, said end surface being divided thereby into a corresponding plurality of elementary salient pole faces extending each longitudinally in the direction of travel of said magnetic field, said elementary pole faces being parallelly juxtaposed and spaced apart transversely of said direction a distance from each other, each magnetic circuit being individually polyphase energizable by said common field winding, said common field winding producing, when polyphase energized, a magnetic field traveling in said direction along the elementary pole face of each of said magnetic circuits to induce in contronting substantially coextensive parts of said armature strip means loop currents linking said elementary pole faces respectively individually so as to develop a substantially constant reactive force per unit width in juxtaposed parts of said armature strip means.

2. An assemblage as set forth in claim 1, said magnetic field assemblage comprising a plurality of equidistant identical units of stacked laminations defining said pole faces, respectively, and having registering transverse slots adapted to accomodate said common winding.

3. An assemblage as set forth in claim 2, said distance being substantially equal to the width of said units.

4. An assemblage as set forth in claim 1, said armature strip means comprising a plurality of juxtaposed armature strips.

* * * * *